(12) United States Patent
Iwamoto et al.

(10) Patent No.: US 7,553,087 B2
(45) Date of Patent: Jun. 30, 2009

(54) SENSOR-EQUIPPED WHEEL SUPPORT BEARING ASSEMBLY

(75) Inventors: Kenichi Iwamoto, Iwata (JP); Ken Yamamoto, Iwata (JP)

(73) Assignee: NTN Corporation, Kawasaki (JP)

( * ) Notice: Subject to any disclaimer, the term of this patent is extended or adjusted under 35 U.S.C. 154(b) by 717 days.

(21) Appl. No.: 11/208,850

(22) Filed: Aug. 23, 2005

(65) Prior Publication Data

US 2006/0045406 A1 Mar. 2, 2006

(30) Foreign Application Priority Data

Aug. 24, 2004 (JP) ............... 2004-243134

(51) Int. Cl.
*F16C 32/00* (2006.01)
*F16C 41/04* (2006.01)

(52) U.S. Cl. .................... 384/448; 324/207.22

(58) Field of Classification Search .............. 384/448; 73/115.07, 115.08, 514.16, 514.31, 514.39; 324/207.13, 207.22–207.25
See application file for complete search history.

(56) References Cited

U.S. PATENT DOCUMENTS

| 4,092,053 | A | * | 5/1978 | Riegler et al. | ............... 384/448 |
|---|---|---|---|---|---|
| 4,778,286 | A | * | 10/1988 | Kadokawa | ................... 384/446 |
| 5,438,260 | A | * | 8/1995 | Rigaux et al. | ................ 324/166 |
| 5,509,310 | A | * | 4/1996 | El-Ibiary | ...................... 73/660 |
| 5,575,568 | A | * | 11/1996 | Rigaux et al. | ............... 384/448 |
| 5,762,425 | A | * | 6/1998 | Ouchi | ........................ 384/448 |
| 6,445,995 | B1 | * | 9/2002 | Mollmann | ................... 701/100 |
| 6,802,208 | B2 | * | 10/2004 | Chinitz et al. | ............ 73/115.07 |
| 6,956,367 | B2 | * | 10/2005 | Fujikawa et al. | ........ 324/207.22 |
| 2003/0218457 | A1 | * | 11/2003 | Aiba et al. | ................... 324/174 |
| 2004/0145365 | A1 | * | 7/2004 | Lutaud et al. | .......... 324/207.22 |
| 2007/0053623 | A1 | * | 3/2007 | Maeda | ....................... 384/448 |

FOREIGN PATENT DOCUMENTS

JP 2003-336652 11/2003

* cited by examiner

*Primary Examiner*—Richard W L Ridley
*Assistant Examiner*—James Pilkington (57) ABSTRACT

A rotation sensor assembly includes an encoder, mounted on one end of an inner member of a bearing, and a rotation sensor fitted to one end of an outer member of the bearing in face-to-face relation with the encoder. A cylindrical wall of a core metal of the encoder press-fitted onto the inner member has a cylindrical extension protruding axially outwardly from one end of the cylindrical wall. A displacement sensor assembly includes a pair of displacement sensors provided in face-to-face relation with the cylindrical extension and spaced equidistantly from each other in a circumferential direction. The rotation sensor is positioned between the displacement sensors in the circumferential direction.

9 Claims, 5 Drawing Sheets

SENSOR-EQUIPPED WHEEL SUPPORT BEARING ASSEMBLY

BACKGROUND OF THE INVENTION

1. Field of the Invention

The present invention relates to a sensor-equipped wheel support bearing assembly having a displacement sensor for detecting a load imposed on a bearing and a rotation sensor for detecting the number of revolution of a wheel, both built therein.

2. Description of the Prior Art

For stabilized run of an automotive vehicle, it is known to provide a wheel support bearing assembly with a rotation sensor for detecting the number of revolution of each of vehicle wheels. In this type of wheel support bearing assembly, the use has been suggested in, for example, the Japanese Laid-open Patent Publication 2003-336652, of sensors, for example, a temperature sensor and a vibration sensor so that in addition to the number of revolutions, vehicle operating conditions useful to the stabilized run of the automotive vehicle can be detected.

To assure a cruising safety of an automotive vehicle in general, the number of revolutions of each of the wheels is detected as a parameter used to control the vehicle cruising performance. However, the use of the number of wheel revolutions is still insufficient and, therefore, it is desired to make use of one or more additional sensors so that the automotive vehicle can be controlled for an improved safety. For this purpose, it is contemplated to control the attitude of the automotive vehicle in dependence on the load acting on each of the vehicle wheels during the traveling of the automotive vehicle.

By way of example, as is well known to those skilled in the art a relatively large load tends to act on the outside wheels during the cornering, on the wheels on one side during the run along the inclined road surface or on the front wheels during the braking, and, thus, a varying load acts on the vehicle wheels. For this reason, if the loads acting on the vehicle wheels can be detected as needed, suspension systems for the vehicle wheels can be controlled beforehand based on results of detection of the loads. By so doing, the attitude control of the automotive vehicle during the traveling thereof, for example, prevention of a rolling motion during the cornering, prevention of downward settling of the front wheels during the braking, and prevention of downward settling of the vehicle wheels brought about by an uneven distribution of live loads can be accomplished. However, no space for installation of the load sensor for detecting the load acting on the respective vehicle wheel is available and, therefore, the attitude control through the detection of the load can hardly be realized.

In the wheel support bearing assembly disclosed in the above mentioned Japanese publication, the detection of the load is accomplished with a displacement sensor fixedly supported by a vehicle-body fitting flange by measuring a gap between the sensor and a surface of an outer member. However, since a detecting portion of the displacement sensor is exposed to the outside, the prior art leaves a problem unsolved as to the durability. Also, considering that the amount of deformation of the outer member is slight, the detecting accuracy is limited accordingly.

Particularly if an attempt is made to install the rotation sensor together with the load sensor, difficulty will be increased as to how those sensors are to be installed in compact.

SUMMARY OF THE INVENTION

In view of the foregoing, the present invention has been devised to substantially eliminating the problems and inconveniences inherent in the prior art and is intended to provide a sensor-equipped wheel support bearing assembly, in which sensors can be installed in compact in the bearing assembly and in which the number of revolutions of the vehicle wheel and the load acting on the vehicle wheel can be detected in a stable fashion.

In order to accomplish the foregoing object, the present invention provides a sensor-equipped wheel support bearing assembly for rotatably supporting a vehicle wheel relative to a vehicle body structure, which includes a bearing including an outer member having an inner peripheral surface formed with a plurality of circumferentially extending raceway surfaces, an inner member having a center bore defined therein and also having an outer peripheral surface formed with circumferentially extending raceway surfaces in alignment with the raceway surfaces in the outer member, and rows of rolling elements operatively interposed between the raceway surfaces in the outer member and the raceway surfaces in the inner member, respectively. The center bore of the inner member receives and fixes therein a stem formed in an outer race of a constant velocity universal joint. The sensor-equipped wheel support bearing assembly also includes a rotation sensor assembly and a displacement sensor assembly.

The rotation sensor assembly includes an encoder, mounted on one end of the inner member and including a core metal, which is press-fitted onto such one end of the inner member and which has a cylindrical wall and a cylindrical extension extending axially outwardly from one end of the cylindrical wall beyond an end face of the inner member, and a sensor mounted on one end of the outer member in face-to-face relation with the encoder. On the other hand, the displacement sensor assembly includes a pair of displacement sensors mounted on that one end of the outer member in face-to-face relation with the cylindrical extension. The displacement sensors are equidistantly spaced from each other in a circumferential direction, with the rotation sensor disposed in a position between the displacement sensors in the circumferential direction.

According to the present invention, since the rotation sensor is positioned between the displacement sensors that are disposed at respective locations circumferentially equidistantly spaced from each other, the rotation sensor can be disposed at any desired position between the displacement sensors in the circumferential direction and the sensors can be arranged in compact in the bearing assembly even in the case where care is required to avoid an undesirable interference between a wiring lead-out port of the rotation sensor and the knuckle. Also, since the cylindrical extension is used as a to-be-detected member cooperable with the displacement sensors, the displacement of the inner member can be amplified to increase the measuring sensitivity, making it possible to measure the axial load acting on the vehicle wheel more accurately.

In a preferred embodiment of the present invention, the encoder may be a magnetic encoder. The use of the magnetic encoder makes it possible to achieve a detection of the number of revolutions with a high resolving power and also with a compact structure.

Also, the rotation sensor may be a Hall element or a magnetoresistance element. The use of the Hall element or the magnetoresistance element makes it possible to detect the rotating condition of the vehicle wheel even at a low speed rotation or at the time the rotation is halted.

In another preferred embodiment of the present invention, each of the displacement sensors may be a reluctance type including a yoke made of a magnetic material and a coil wound around the yoke. The displacement sensor of the reluctance type enables the detection at a high resolution.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A preferred embodiment of the present invention will now be described with particular reference to the accompanying drawings, particularly to FIGS. 1 to 7. A wheel support bearing assembly according to this embodiment is an inner race rotating model of a third generation type and is shown as applied for supporting a drive wheel of an automotive vehicle. It is to be noted that the terms, "outboard" and "inboard", hereinabove and hereinafter used in this specification, are intended to represent the sides facing the outside and inside of the vehicle, respectively. So far shown in FIG. 1, left and right portions of the drawing sheet represent outboard and inboard sides, respectively.

Figure 1:
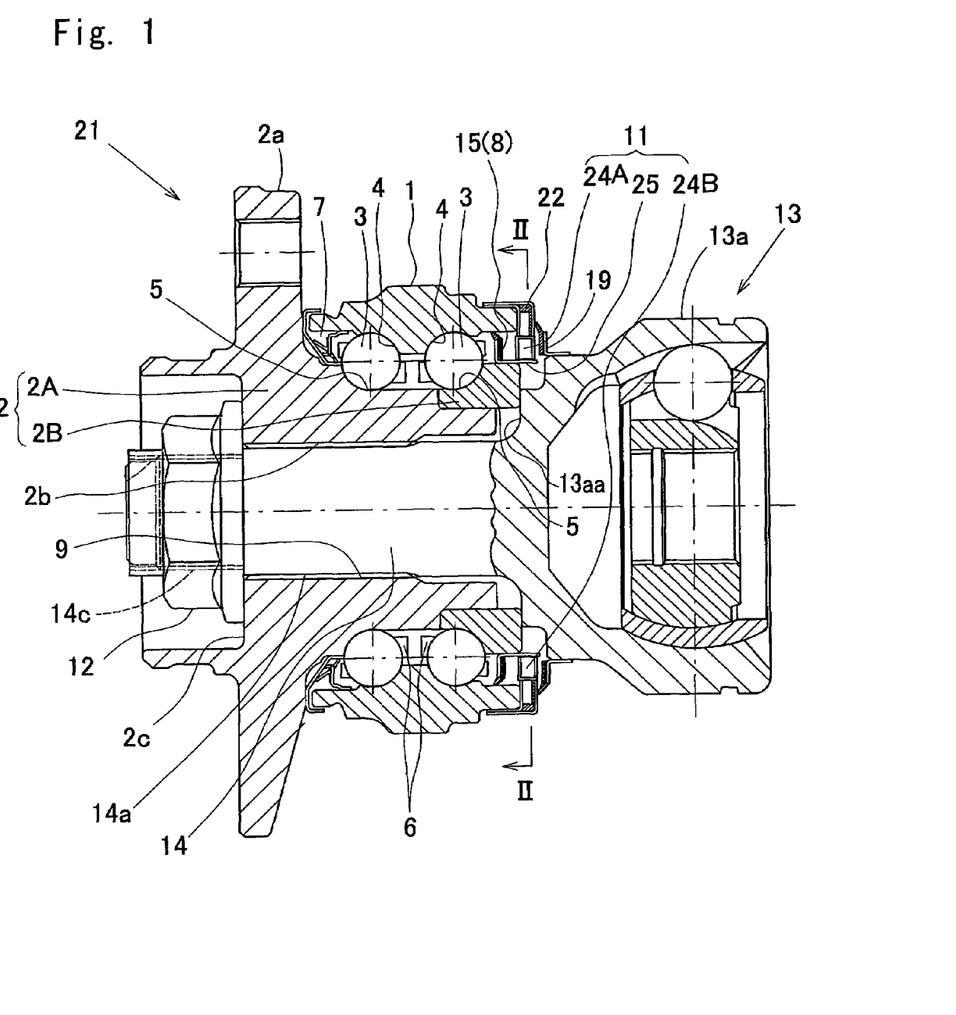
FIG. 1 is a longitudinal sectional view of a sensor-equipped wheel support bearing assembly according to a preferred embodiment of the present invention.

Referring to FIG. 1, the wheel support bearing assembly has a bearing 21 including an outer member 1 having an inner peripheral surface formed with a plurality of axially spaced inboard and outboard raceway surfaces 4, an inner member 2 positioned inside the outer member 1 and having an outer peripheral surface formed with axially spaced inboard and outboard raceway surfaces 5 in alignment with the respective outer inboard and outboard raceway surfaces 4, and circumferentially extending rows of rolling elements 3, the rolling elements 3 each row being accommodated operatively within an annular bearing space delimited between the outer and inner members 1 and 2 and rollingly received in part within the corresponding outer raceway surface 4 and in part within the corresponding inner raceway surface 5.

The bearing 21 is a dual-row angular ball bearing, in which the outer and inner raceway surfaces 4 and 5 represent a generally arcuate sectional shape and have a respective contact angle to form a back-to-back relation. The rolling elements 3 are a ball and are operatively retained in position by a respective ball retainer 5 in each row.

Figure 3:
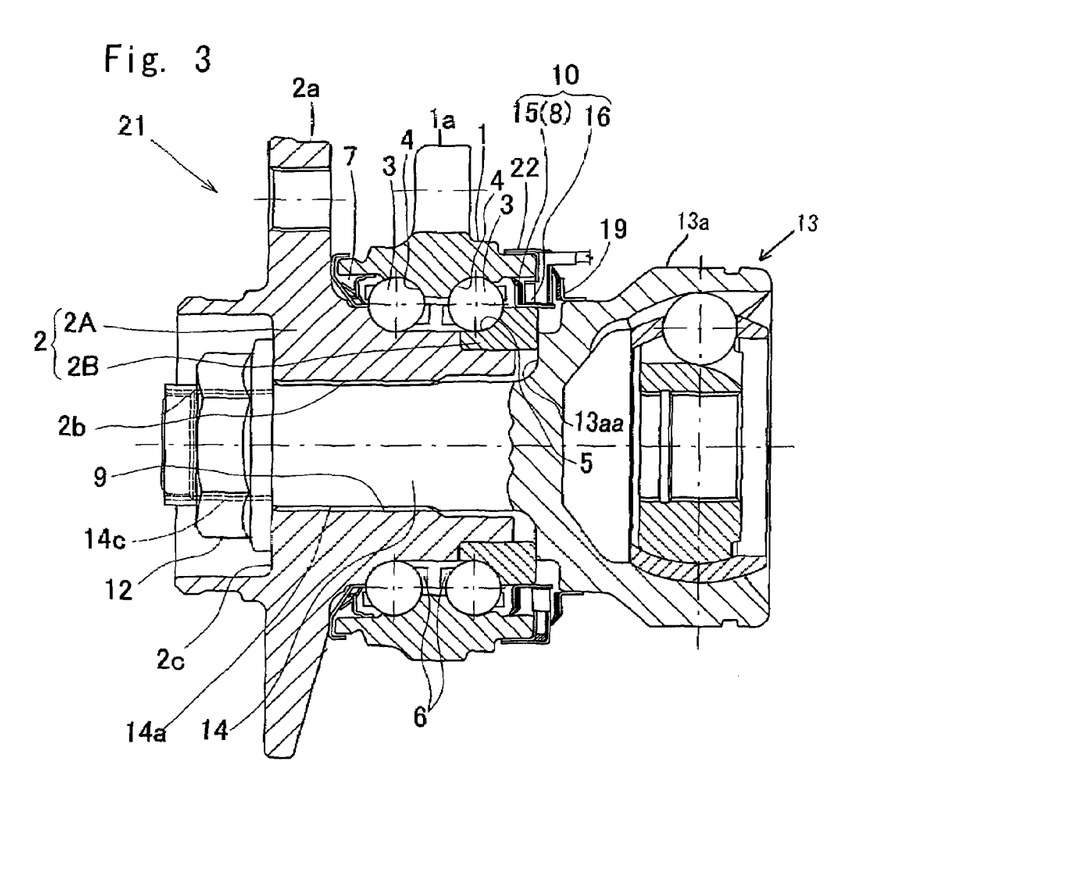
FIG. 3 is a cross-sectional view taken along the line B-O-B in FIG. 2.

The outer member 1 serves as a stationary member and is of one-piece construction including a vehicle-body fitting flange 1a extending radially outwardly from an outer peripheral surface thereof, as shown in FIG. 3, and is fixed to a knuckle (not shown). The vehicle-body fitting flange 1a is firmly fastened to the knuckle, provided in the vehicle body structure (not shown), by means of a circumferentially spaced fastening bolts (now shown).

The inner member 2 serves as a rotatable member and includes a hub axle 2A having an outer peripheral surface formed with a radially outwardly extending, wheel mounting flange 2a, and a separate inner race 2B mounted on an outer periphery of an inboard end of the hub axle 2. The inboard and outboard raceway surfaces 5 are defined in respective outer peripheral surfaces of the hub axle 2A and the inner race 2B, respectively. The hub axle 2A is coupled with an outer race 13a of a universal joint, for example, a constant velocity universal joint 13 for rotation together therewith. More specifically, the hub axle 2A has an axially extending center bore 9 defined therein. Into the bore 9 is inserted a stem 14 that is formed integrally with the outer race 13a of the constant velocity universal joint 13. The stem 14 has a free end portion formed with a male thread 14c for threadingly receiving a nut member 12. Accordingly, with the stem 14 inserted into the center bore 9 of the hub axle 2A, fastening of the nut member 12 results in the nut member 12 being brought into contact with a stepped face 2c, formed in an outboard open end of the center bore 9 of the hub axle 2A, to urge the outer race 13a of the constant velocity universal joint 13 against the hub axle 2a in the outboard direction and, hence, fix it to the hub axle 2A.

The center bore 9 of the hub axle 2A is formed with a plurality of spline grooves 2b, with which mating spline grooves 14a defined in an outer peripheral surface of the stem 14 are engaged to allow the hub axle 2A and the outer race 13a to rotate together. The inner race 2B is axially fastened and fixed to the hub axle 2A when a shoulder 13aa of a base end of the stem 14 integral with the outer race 13a of the constant velocity universal joint 13 is urged against an inboard end face of the inner race 2B as a result of the fastening of the nut member 12.

The annular bearing space delimited between the outer and inner members 1 and 2 has outboard and inboard open ends opposite to each other, which are sealed by contact-type outboard and inboard sealing members 7 and 8, respectively.

A rotation sensor assembly 10 and a displacement sensor assembly 11 are arranged in an inboard end of the bearing 21 as shown in FIGS. 1 and 3. The rotation sensor assembly 10 includes, as best shown in FIG. 3, an encoder 15 mounted on an outer peripheral surface of an inboard end of the inner member 2 and a rotation sensor 16 so carried by an inboard end of the outer member 1 as to axially align with the magnetic encoder 15.

Figure 4:
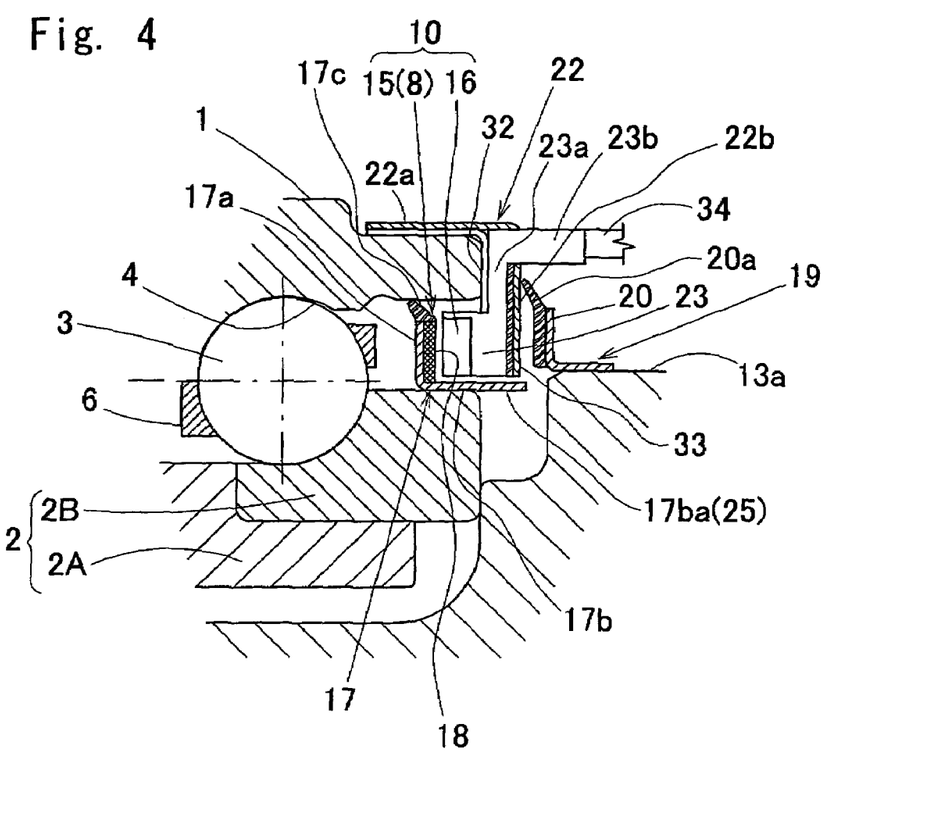
FIG. 4 is a fragmentary longitudinal sectional view, showing a portion of the wheel support bearing assembly on an enlarged scale.
Figure 5:
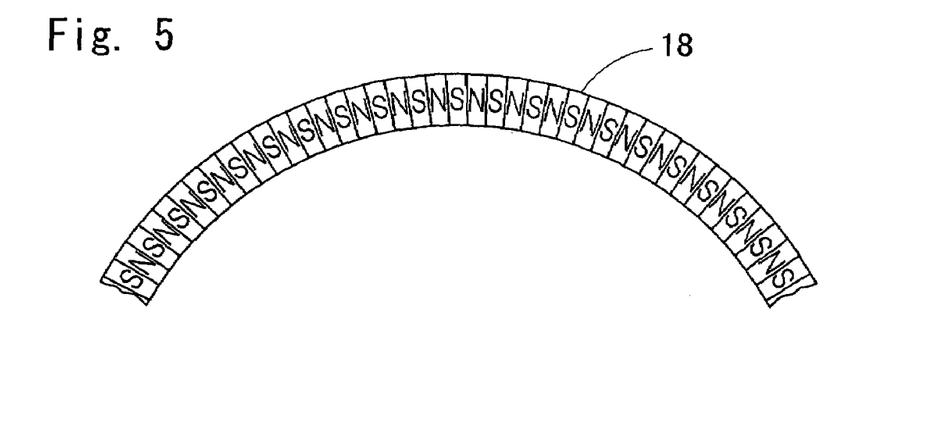
FIG. 5 is a fragmentary front elevational view, showing a portion of a magnetic encoder forming a part of a rotation sensor employed in the wheel support bearing assembly.

The encoder 15 forming a part of the rotation sensor assembly 10 is in the form of a magnetic encoder including a multipolar magnet 18 fixedly mounted on one of opposite surfaces of a radially outwardly extending upright wall 17a of a generally L-sectioned annular core metal 17 as shown in FIG. 4. In the practice of the present invention, the multipolar magnet 18 is mounted on the surface of the upright wall 17a facing in the inboard direction. This encoder 15 is carried by the inner member 2 as an axially extending cylindrical wall 17b of the core metal 17 is press-fitted onto an outer peripheral surface of an inboard end of the inner race 2B. This cylindrical wall 17b of the core metal 17 has a cylindrical extension 17ba protruding axially outwardly beyond an end face of the inner race 2B in a direction away from the upright wall 17a, that is, in the inboard direction. The multipolar magnet 18 is a member having opposite magnetic poles N and S alternating in a direction circumferentially thereof as shown in FIG. 5 and may be a rubber magnet, a plastic magnet or a sintered magnet.

In the illustrated embodiment, the encoder 15 concurrently serves as the inboard sealing member 8 having an elastic sealing lip 17c made of a rubber material or the like. The sealing lip 17c is formed on an outer peripheral edge of the upright wall 17a of the core metal 17 and is held in sliding contact with an inner peripheral surface of the outer member 1 to seal the inboard open end of the annular bearing space between the inner and outer members 2 and 1.

The rotation sensor 16 forming another part of the rotation sensor assembly 10 is in the form of a magnetic sensor capable of detecting magnetic fields emanating from the encoder 15 and is mounted on the outer member 1 through a sensor fitting member 22. The rotation sensor 16 may be in the form of a Hall element, a magnetoresistance element or the like and is embedded in a sensor holder 23 made of a synthetic resin or the like. It is, however, to be noted that the encoder 15 and the rotation sensor 16 may be of an optical type.

Figure 6:
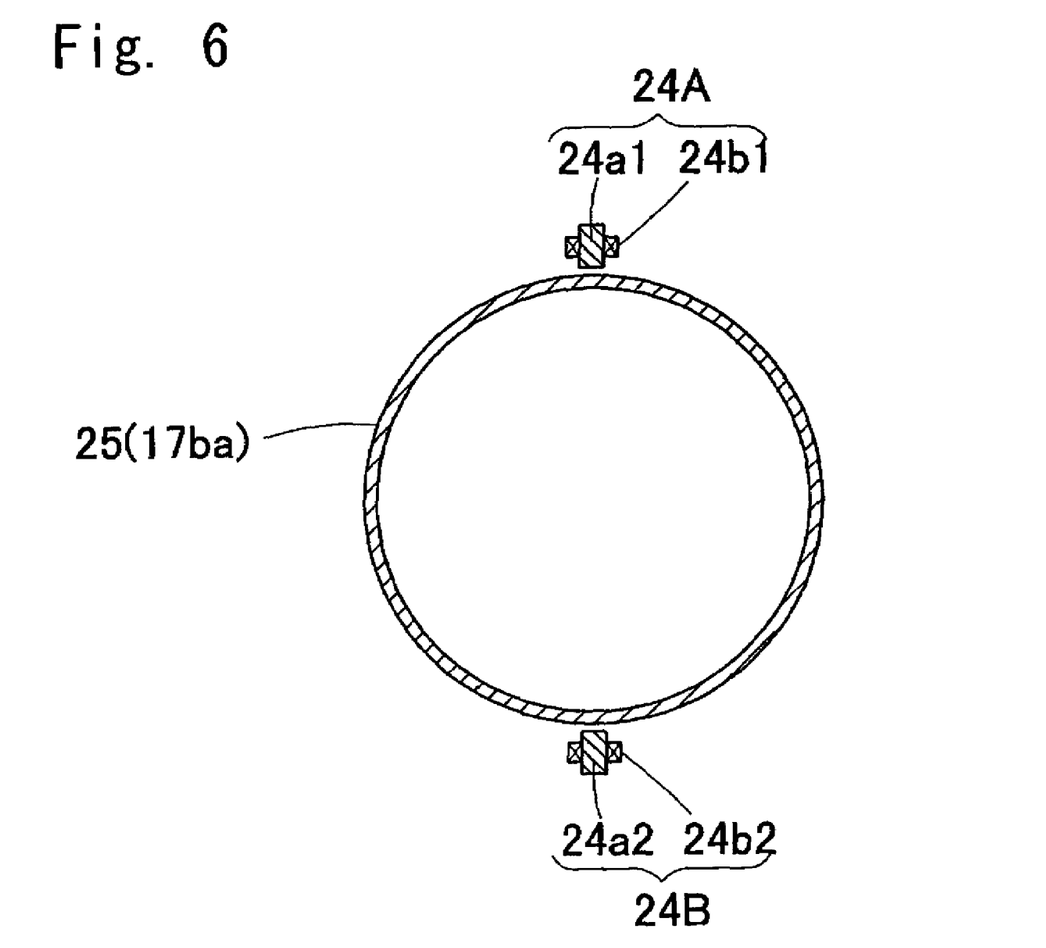
FIG. 6 is a transverse sectional view of a displacement sensor unit in the wheel support bearing assembly.

The displacement sensor assembly 11 is operable to detect a displacement of the inner member 2 caused by a bending moment generated during turning of the automotive vehicle and then to estimate the bending moment. This displacement sensor assembly 11 includes, as best shown in FIG. 1, a pair of displacement sensors 24A and 24B, which form a detecting unit, and a to-be-detected member 25. The displacement sensor assembly 11 has a section schematically shown in FIG. 6. As shown in FIG. 6, the displacement sensors 24A and 24B are of a reluctance type, in which respective coils 24b1 and 24b2 are wound around yokes 24a1 and 24a2 made of a magnetic material, with the displacement sensors 24A and 24B spaced circumferentially equidistantly (in the illustrated embodiment, spaced 180° from each other in a circumferential direction so as to assume top and bottom positions, respectively). The coils 24b1 and 24b2 are wound around the respective yokes 24a1 and 24b1 so as to enable the yokes 24a1 and 24b1 to have different polarities. Although the coils 24b may be wound directly around the respective yokes 24a, resinous bobbins (not shown) may be interposed between the coils 24b and the associated yokes 24a.

The to-be-detected member 25 forming a part of the displacement sensor assembly 11 is the cylindrical extension 17ba of the cylindrical wall 17b of the encoder core metal 17 and has an outer peripheral surface so grounded as to control the degree of concentric alignment with the inner race 2B, hence to minimize a radial fluctuation of the outer peripheral surface. In a condition in which no load act on the bearing 21, respective tips of the yokes 24a1 and 24a2 oriented radially inwardly of the to-be-detected member 25 are spaced an equal distance from the to-be-detected member 25. In other words, the gap between the tip of the yoke 24a1 and the to-be-detected member 25 is equal in size to the gap between the tip of the yoke 24a2 and the to-be-detected member 25.

Figure 7:
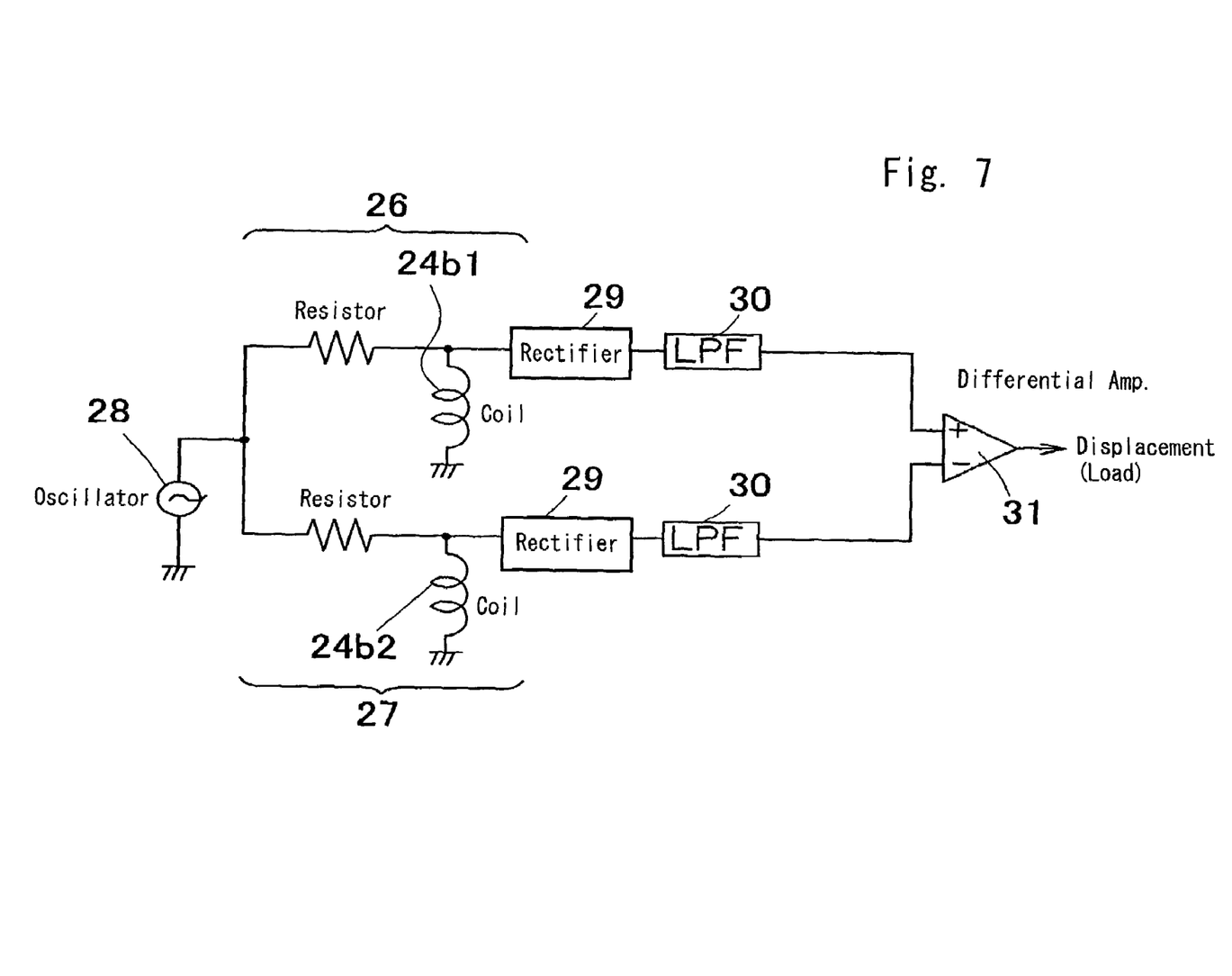
FIG. 7 is a schematic circuit diagram showing a detecting circuit of the displacement sensor unit employed in the wheel support bearing assembly.

A detecting circuit of the displacement sensor assembly 11 is shown in FIG. 7. In this instance, reference is made to detection of the load imposed when a bending moment acts on the bearing 21. The illustrated detecting circuit includes a first series-connected circuit 26, having the coil 24b1 and a resistor, and a second series-connected circuit 27 having the coil 24b2 and a resistor and connected parallel to the first series-connected circuit 26. The detecting circuit also includes an oscillator 28 for applying an alternating voltage of a few tens kHz between the first and second series-connected circuits 26 and 27. A divided voltage supplied to the first coil 24b1 is, after having been converted into a direct current voltage by a rectifier 29 and a low-pass filter 30, supplied to a first input terminal of a differential amplifier 31. On the other hand, a divided voltage supplied to the second coil 24b2 is also, after having been converted into a direct current voltage by a rectifier 29 and a low-pass filter 30, supplied to a second input terminal of the differential amplifier 31. The differential amplifier 31 amplifies the difference between the voltages supplied to the first and second input terminals, respectively and outputs an amplified difference signal. This amplified difference signal represents an indication of the bending moment so detected.

As shown in FIG. 4 on an enlarged scale, the sensor fitting member 22 is comprised of two metallic plates overlapped one above the other and includes a cylindrical wall 22a, press-fitted onto the outer peripheral surface of the outer member 1, and a radial wall 22b that extends radially inwardly from the cylindrical wall 22a and that is axially positioned relative to the outer member 1 while contacting an annular end face of the outer member 1. The radial wall 22b of the sensor fitting member 22 is made up of inner and outer plate members 32 and 33 opposed to each other with a gap defined therebetween. The sensor holder 23, having the rotation sensor 16 embedded therein, and the pair of the displacement sensors 24A and 24B are inserted into the gap between the inner and outer plate members 32 and 33 and are then sandwiched therebetween to define a single sensor unit. Accordingly, there is no possibility that the rotation sensor 16 and the displacement sensors 24A and 24B are separated out of the gap, ensuring a firm mounting of the sensor unit with high reliability. Also, as described previously, since the radial wall 22b is axially positioned in contact with the end face of the outer member 1, the positioning of the sensor fitting member 22 can readily and precisely be carried out so that the rotation sensor 16 can be highly precisely positioned relative to the encoder 15. The sensor holder 23 has a cord cover 23b extending rearwardly (in the inboard direction) from a holder body 23a thereof. A cord 34 extends outwardly from a free end of the cord cover 23b.

An elastic element may be interposed between the plate members 32 and 33 or a bottom plate portion (an inner peripheral portion) of the sensor fitting member 22 and the sensor (the sensor holder 23 for the displacement sensors 24 and the rotational sensor 16). Such interposition of the elastic element is effective to accomplish a stabilized fitting of the rotational sensor 16 and the displacement sensors 24 to the sensor fitting member 22 without allowing the sensors 16 and 24 to undergo a rattling motion relative thereto and also without allowing an unreasonable clamping force to be applied thereto. Also, the elastic element so interposed may concurrently serves as a sealing element for sealing a gap between the outer member 1 and the sensor fitting member 22.

Figure 2:
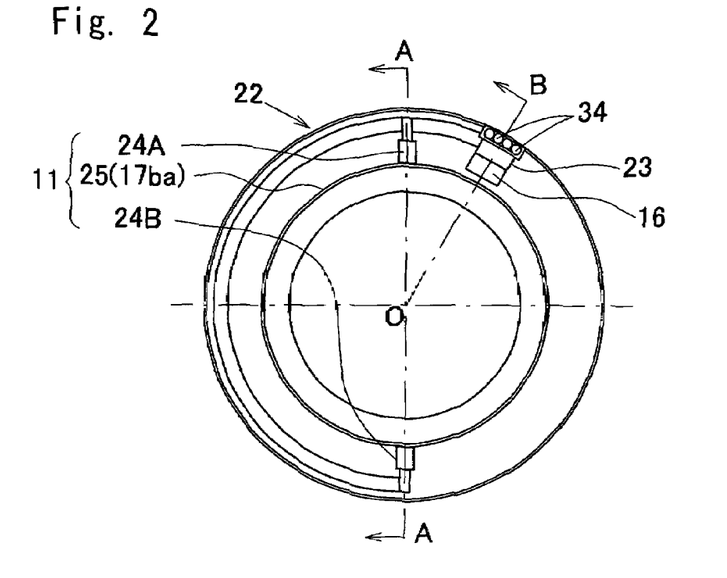
FIG. 2 is a cross-sectional view taken along the line II-II in FIG. 1.

FIG. 2 illustrates a cross-sectional view taken along the line II-II in FIG. 1. The position of the sensor holder 23 (the rotation sensor 16) in the sensor fitting member 22 is chosen to be any position between the top and bottom displacement sensors 24A and 24B in the circumferential direction. It often occur that a wiring lead-out port, through which a wiring from the rotation sensor 16 is led out, (i.e., the cord cover 23b of the sensor holder 23 shown in FIG. 4) must be positioned at a location sufficient to avoid interference with a knuckle. However, the positioning of the rotation sensor 16 in the manner described above can allow the rotation sensor 16 to be disposed at any desired position in the sensor fitting member 22 in the circumferential direction. It is to be noted that FIG. 1 illustrates a cross-section taken along the line A-O-A in FIG. 2 whereas FIG. 3 illustrates a cross-section taken along the line B-O-A in FIG. 2.

The outer race 13*a* of the constant velocity universal joint 13 shown in FIG. 3 has a different sealing member 19 press-fitted onto an outer periphery of the outer race 13*a* to close an open end of an annular space delimited between the sensor fitting member 22 and the outer race 13 of the constant velocity universal joint 13. As shown in FIG. 4, the sealing member 19 includes a generally L-sectioned annular core metal 20 having an outer peripheral portion provided with an elastic sealing lip 20*a* made of a rubber material or the like, which lip 20*a* is slidingly engaged with a side face of the sensor fitting member 22. When the sealing member 19 is used to seal off a gap between the sensor fitting member and the outer race 13*a* of the constant velocity universal joint 13 in the manner described above, it is possible to avoid an undesirable ingress of foreign matter such as, sand particles in between the encoder 15 and the rotation sensor 16, which would otherwise brought about by an ingress of muddy water and/or rocks from a road surface.

With the sensor-equipped wheel support bearing assembly having been described hereinabove, the number of revolutions of the vehicle wheel can be detected from a detection signal outputted from the rotation sensor 16 for detecting a magnetic change of the encoder 15 resulting from rotation of the vehicle wheel. This detection signal can be utilized as a control signal for the anti-skid brake system (ABS).

Also, when the bending moment acts on the bearing 21 as the automobile vehicle turns, the inner member 2 displaces relative to the outer member 1, fixed to the knuckle, in a rotating direction about the bearing 21 and, therefore, the pair of the displacement sensors 24A and 24B can detect the displacement of the cylindrical wall 17*b* of the encoder core metal 17 provided in the inner member 2 as the bending moment. In particular, since the cylindrical extension 17*ba* protruding axially outwardly in the inboard direction from the inboard end of the cylindrical wall 17*b* of the encoder core metal 17 beyond the inner race 2B is utilized as the to-be-detected member 25, the displacement of the inner member 2 can be amplified to increase the measuring sensitivity and, therefore, the axial load on the vehicle wheel can be measured more accurately.

When the rotation sensor 16 is disposed in between the displacement sensors 24A and 24B, care must be taken to avoid an undesirable interference between the wiring lead-out port of the rotation sensor 16 and the knuckle. In such case, the rotation sensor 16 must be disposed at a carefully chosen position, but the foregoing structure designed according to the present invention allows the rotation sensor 16 to be disposed at any position.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor-equipped wheel support bearing assembly to rotatably support a vehicle wheel relative to a vehicle body structure, comprising:

a bearing including an outer member having an inner peripheral surface formed with a plurality of circumferentially extending raceway surfaces, an inner member having a center bore defined therein and also having an outer peripheral surface formed with circumferentially extending raceway surfaces in alignment with the raceway surfaces in the outer member, and rows of rolling elements operatively interposed between the raceway surfaces in the outer member and the raceway surfaces in the inner member, respectively, the center bore of the inner member receiving and fixing therein a stem formed in an outer race of a constant velocity universal joint;

a rotation sensor assembly including an encoder, mounted on one end of the inner member, and a rotation sensor mounted on one end of the outer member in face-to-face relation with the encoder, the encoder including a core metal press-fitted onto the one end of the inner member and having a cylindrical wall and a cylindrical extension, the cylindrical extension extending axially outwardly from one end of the cylindrical wall beyond an end face of the inner member; and a displacement sensor assembly including a pair of displacement sensors mounted on the one end of the outer member that is in face-to-face relation with the cylindrical extension, the displacement sensors being equidistantly spaced from each other in a circumferential direction and detecting a radial distance between the displacement sensor and the cylindrical extension, the rotation sensor being disposed between the displacement sensors in the circumferential direction.

2. The sensor-equipped wheel support bearing assembly as claimed in claim 1, wherein the encoder is a magnetic encoder.

3. The sensor-equipped wheel support bearing assembly as claimed in claim 1, wherein the rotation sensor is a Hall element or a magnetoresistance element.

4. The sensor-equipped wheel support bearing assembly as claimed in claim 1, wherein each of the displacement sensors is a reluctance type including a yoke and a coil wound around the yoke.

5. The sensor-equipped wheel support bearing assembly as claimed in claim 1, wherein the core metal further includes an upright wall protruding radially outwardly from the cylindrical wall and the encoder is mounted on the upright wall.

6. The sensor-equipped wheel support bearing assembly as claimed in claim 1, wherein the core metal is press-fitted on an outer peripheral surface of an inboard end of the inner member.

7. The sensor-equipped wheel support bearing assembly as claimed in claim 1, wherein the core metal further comprises:

an upright wall protruding radially outwardly from the cylindrical wall; and an elastic sealing member having an elastic sealing lip mounted on an outer peripheral edge of the upright wall for sliding engagement with the inner peripheral surface of the outer member.

8. The sensor-equipped wheel support bearing assembly as claimed in claim 1, further comprising:

a sensor fitting member including a cylindrical wall, mounted on an outer peripheral surface of the outer member; and a radial wall that extends radially inwardly from the cylindrical wall and that is axially positioned relative to the outer member while contacting an annular end face of the outer member, wherein the sensors are mounted on the outer member through the sensor fitting member.

9. The sensor-equipped wheel support bearing assembly as claimed in claim 1, wherein the displacement sensor assembly further includes a detecting circuit to detect a load by calculating a bending moment loaded on the cylindrical extension based on signals for the pair of displacement sensors.

* * * * *